(12) United States Patent
Lindsay

(10) Patent No.: US 6,564,267 B1
(45) Date of Patent: May 13, 2003

(54) NETWORK ADAPTER WITH LARGE FRAME TRANSFER EMULATION

(75) Inventor: Steven B. Lindsay, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/444,761

(22) Filed: Nov. 22, 1999

(51) Int. Cl.⁷ .............................................. G06F 15/16
(52) U.S. Cl. .................. 709/250; 709/230; 370/465; 370/470; 370/472
(58) Field of Search ................................ 709/230, 231, 709/232, 250; 370/465, 470, 472

(56) References Cited

U.S. PATENT DOCUMENTS

| | | | | |
|---|---|---|---|---|
| 5,937,169 A | * | 8/1999 | Connery et al. | 709/250 |
| 6,141,705 A | * | 10/2000 | Anand et al. | 709/107 |
| 6,327,626 B1 | * | 12/2001 | Schroeder et al. | 709/227 |
| 6,370,114 B1 | * | 4/2002 | Gullicksen et al. | 370/229 |

OTHER PUBLICATIONS

Aaron Leonard, "Re: How to ignore TCP MSS Option", from comp.protocols.tcp–ip on "Google.com", Dec. 13, 1997.*
Vernon Schryver, "Re: ? on Max Segment Size", from comp.protocols.tcp–ip on "Google.com", Aug. 21, 1996.*
Information Sciences Institute—University of Southern California, *Internet Protocol, DARPA Internet Program Protocol Specification*, Sep. 1981, pp 1–49.
Information Sciences Institute—University of Southern California, *Transmission Control Protocol, DARPA Internet Program Protocol Specification*, Sep. 1981, pp 1–88.
Microsoft, "Windows 2000 DDK Task Offload", Oct. 22, 1999, 19 pages.

* cited by examiner

*Primary Examiner*—Zarni Maung
*Assistant Examiner*—Jinsong Hu
(74) *Attorney, Agent, or Firm*—Marger Johnson & McCollom

(57) ABSTRACT

A network adapter and corresponding method for its use are disclosed. The network adapter advertises a large packet data maximum segment size (MSS) to its host, even though it cannot support this MSS on its physical connection. When the host then tries to negotiate remote connections using this large MSS, the adapter performs packet header manipulations such that the host believes it has negotiated a large MSS connection, and the remote endpoint believes it has negotiated a smaller, physically achievable MSS connection. The host should then send large packets, corresponding to the large MSS, to the network adapter. This decreases the workload of the host CPU and decreases bus utilization by the adapter.

Using its knowledge of the local and remote MSS values, the adapter transparently segments the large packets into multiple smaller packets that are digestible by the remote endpoint and transmits these according to the remote endpoint's receive window. Preferably, the adapter also emulates a receive window to the host that corresponds to the large MSS.

29 Claims, 14 Drawing Sheets

NETWORK ADAPTER WITH LARGE FRAME TRANSFER EMULATION

FIELD OF THE INVENTION

This present invention relates to computer networking, and more particularly to a network adapter and method for emulating large-block transfers to an attached host.

BACKGROUND OF THE INVENTION

The rapid growth in computer networking has spurred the development of ever-faster network media rates. For instance, over the last ten years, Ethernet-format maximum media rates have gone from 10 megabits-per-second (Mbps), to 100 Mbps (fast Ethernet), and now to 1000 Mbps (gigabit Ethernet). Future increases are planned to allow even faster network communications.

Traditionally, networked host computers have handled communication tasks at the network and transport layers (and some tasks at the link layer) using host software, while leaving the remaining link and physical layer communication tasks to an attached network adapter (which also may be partially implemented in host-resident driver software). Thus for virtually every packet transmitted or received by the network adapter, the host processor must expend resources in handling packetization, header manipulation, data acknowledgement, and error control. At gigabit Ethernet speeds, even sophisticated server systems will often have a maximum network transmission rate limited by the ability of the host processor to handle its network and transport layer tasks, rather than by the speed of the physical connection. Consequently, host-implemented networking tasks can reduce bandwidth utilization and occupy processor throughput that could otherwise be devoted to running applications.

Some network adapter vendors have attempted to increase network performance by offloading the entire transport and lower-layer protocol stack to the network adapter. This approach greatly eases the burden on the host processor, but increases the complexity and expense of the adapter. It also limits flexibility, limits upgradability, and makes platform-specific tailoring difficult. Such an adapter may also require that the entire network stack be rewritten to allow the hardware solution to integrate with the operating system.

Several less-severe modifications to the traditional division of labor between a host processor and a network adapter have also been proposed. One of the more appealing of these proposals is a feature known as "TCP segmentation offload" (See the Microsoft Windows 2000 -Device Driver Development Kit for detailed information. Transmission Control Protocol/Internet Protocol (TCP/IP) is perhaps the most popular transport/network layer protocol suite in use today. See Network Working Group, RFC 791, *Internet Protocol* (1981); Network Working Group, RFC 793, *Transmission Control Protocol* (1981)). With TCP segmentation offload, the host processor can indicate to the network adapter that a large block of data is ready for TCP transmission, rather than passing numerous smaller TCP packets (each containing part of the large block of data) to the network adapter. With offloading, the network adapter segments the block of data into the smaller packets, builds the TCP, IP, and link-layer headers for each packet, and transmits the packets.

TCP segmentation offload benefits overall system performance due to several factors. First, sending a large block of data requires fewer calls down through the software protocol stack than does sending multiple small blocks, thus reducing CPU utilization for a given workload. Second, when the headers are built in the network adapter hardware, header-building host overhead is avoided, and header information must only be transferred across the host bus once per block rather than once per packet, reducing latency and lowering bus utilization. And third, the network adapter hardware can reduce the number of host interrupts that it generates in order to indicate data transmission, in some instances down to one per block.

I have now recognized that, despite its benefits, TCP segmentation offload has several drawbacks. One drawback is that because the capability has been developed to operate with a single operating system vendor's software, network adapter hardware and driver modifications that allow offloading do not work with other vendor's operating systems. A second drawback is that the offload capability is one-way (transmit) only. A third drawback is that despite the offload capability, the host cannot offload a data block larger than the remote endpoint's receive window size.

SUMMARY OF THE INVENTION

In accordance with one aspect of the present invention, a method for operating a network adapter is disclosed. According to this method, the network adapter intercepts connection negotiation packets passing between the transmission control protocol layer and a remote endpoint. The network adapter modifies the maximum segment size of the packets as necessary such that the transmission control protocol layer receives an indication that the remote endpoint has accepted a first maximum segment size for the connection, and the remote endpoint receives an indication that the host computer has accepted a second, smaller maximum segment size for the connection. Thereafter, upon receiving a request from the transmission control protocol layer to transfer an original data packet larger than the second maximum segment size to the remote endpoint over the connection, the network adapter segments the original data packet into multiple secondary data packets, each having a size no greater than the second maximum segment size. These secondary packets are transmitted by the network adapter to the remote endpoint.

In another aspect of the invention, a network adapter is disclosed. The network adapter comprises a network interface and a packet buffer memory to buffer packets for transmission over the network interface. A connection parameter manager, also part of the network adapter, negotiates for a given connection a first maximum segment size with a local host and a second, smaller maximum segment size with a remote endpoint. The network adapter also has a context engine that establishes and services a connection context when the local host requests transmission over the connection of a data packet having a size greater than the remote endpoint's maximum segment size. The network adapter also has a packet engine to segment the data packet into multiple secondary data packets, each having a size no greater than the remote endpoint's maximum receive segment size, and place these secondary packets into the packet buffer memory.

Also, an article of manufacture comprising a computer-readable medium containing a driver program for a network adapter is disclosed. When executed, the driver program configures a processor to run a connection parameter manager to negotiate, for a connection, a first maximum segment size with a local host and a second, smaller maximum segment size with a remote endpoint. When executed, the driver program also configures a processor to run a context scheduler to match host-originated data packets to the connection and request a packet segmentation context on the network adapter when a matched data packet is larger than the second maximum segment size.

BRIEF DESCRIPTION OF THE DRAWING

The invention may be best understood by reading the disclosure with reference to the drawing, wherein.

DETAILED DESCRIPTION OF THE PREFERRED EMBODIMENTS

Figure 1:
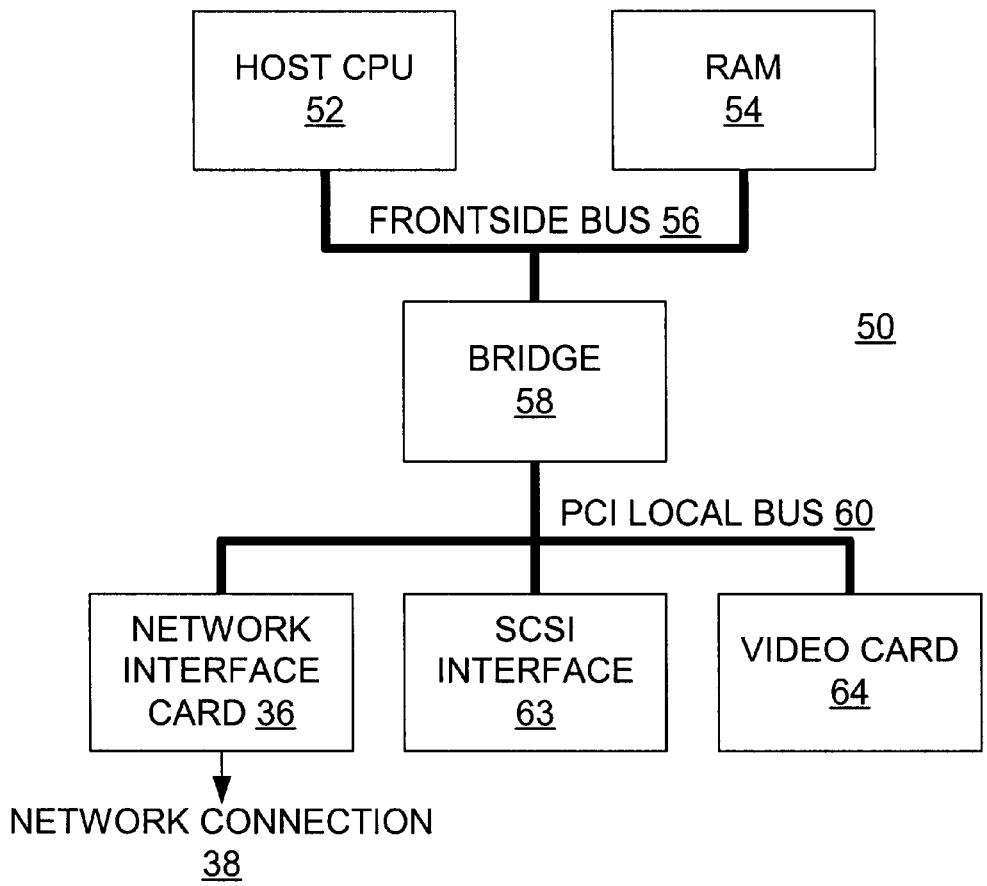
FIG. 1 illustrates a block diagram of a computer system using a network interface card.

The preferred embodiments disclosed below were selected by way of illustration and not by way of limitation. The terms network adapter and network interface card (NIC) are used somewhat interchangeably herein, with the realization that a network adapter need not be implemented on a "card", but may, e.g., be implemented directly on a motherboard or in an embedded network appliance. Also, a network adapter typically comprises both a hardware component and a software driver running on the host system.

As used herein, a "context" or "connection context" refers to the group of variables (addresses, data pointers, etc.) used to describe a packet segmentation (transmit) or reassembly (receive) job performed by the network adapter according to an embodiment of the invention. Although a context for each of several TCP/IP connections may be open simultaneously, normally only one context for any one connection will be active at any given time.

Briefly and by way of introduction, overcoming the identified limitations of TCP segmentation offload—its limitation to a single operating system, data sizes no greater than the receive window size, and transmit-only capability—has motivated the development of the disclosed embodiments. The disclosed embodiments can overcome either the first only, the first and second, or all three of these limitations, and can implement other enhancements that potentially increase the performance of a system by further decreasing both the number of communications between host and interface card and the number of operations that must be performed by the host.

In general, the disclosed embodiments can be made operating system independent. The network adapter indicates to its host an ability to transfer large data blocks (e.g., six times or ten times the standard Ethernet block size for an Ethernet adapter), even when (a) it is not or cannot be physically configured to actually transfer such a data block in a single physical frame, and/or (b) the remote endpoint with which it is communicating cannot accept such a data block. Then, when a TCP connection is actually negotiated with a remote endpoint, the network adapter hardware and/or driver manipulates the synchronization packets such that the host believes that it has negotiated a large maximum data segment size for the connection, and the remote endpoint believes that it has negotiated a smaller (but physically feasible) data segment size. The adapter itself recognizes when the host subsequently attempts to send a packet that exceeds the remote endpoint's capabilities, and breaks the packet into smaller packets for transmission.

Preferably, the network adapter also emulates a remote window to the host that matches the host's "negotiated" maximum segment size (e.g., a window twice the maximum segment size). With this enhancement, the network adapter interprets the actual window information coming from the remote endpoint, and controls the transmission of packets to the remote host accordingly and transparently, as far as the host is concerned. Meanwhile, the window size seen by the host is adequate for it to pipeline several large block transfer requests.

The disclosed embodiments can also operate bidirectionally, e.g., by assembling the data from small blocks received from a remote endpoint into larger blocks. When a block of data equal to, or slightly smaller than, the large local data block size has been assembled, it is passed to the host. This may involve other considerations, such as the generation of intermediate acknowledgements to the remote endpoint, and halting the assembly of a block if packet delay becomes excessive.

Turning now to the details of the embodiments, a block diagram for a computer system 50 utilizing the invention is shown (the diagram is labeled prior art because in the preferred embodiments, no changes to the system configuration are required). The computer system's CPU 52 is coupled to RAM 54 via frontside bus 56, which may be, e.g., a Pentium Pro™ processor local bus. This bus is coupled to PCI local bus 60 through bridge 58, which allows communication between a first system element connected to frontside bus 56 and a second system element connected to PCI (Peripheral Component Interconnect) local bus 60.

Various peripherals can be connected to computer system 50 through PCI local bus 60. For instance, SCSI interface 63 can be used to connect disk drives to the system, and video card 64 provides an interface to a video monitor. Network interface card 36 also connects to PCI local bus 60, and includes an external network connection 38 such as an electrical or optical gigabit Ethernet link. Those skilled in the art will recognize that a wide variety of similar configurations are roughly equivalent to that shown for system 50, and that various well-known details, not pertinent to the invention, have been omitted.

Figure 2:
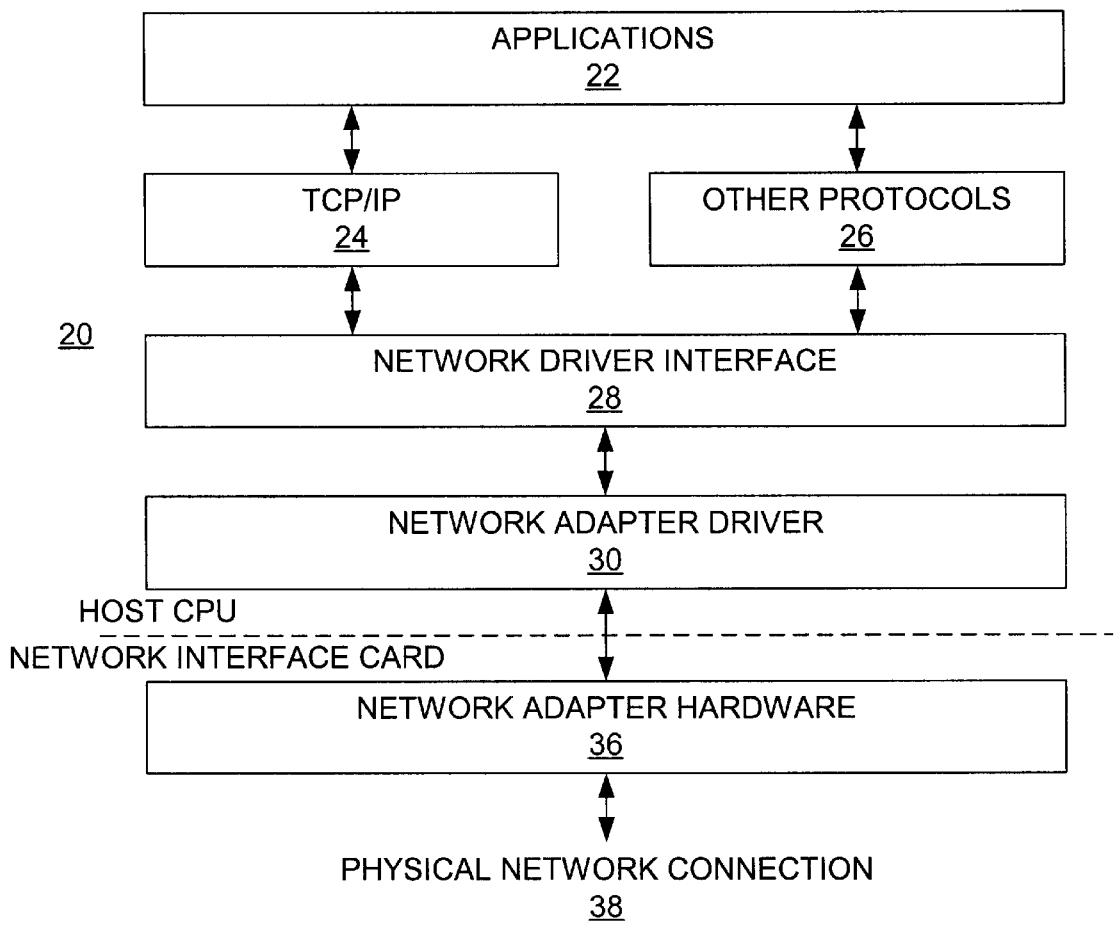
FIG. 2 illustrates a protocol stack, showing the division of labor between a host CPU and a network adapter.

FIG. 2 illustrates a typical network communications stack for a network adapter-equipped computer system such as system 50. Those tasks performed in software on the host CPU are shown above the dashed line. At the highest level, applications 22 such as FTP, ping, etc., communicate with TCP/IP 24 and/or other protocols 26. TCP/IP 24 communicates with network driver interface 28, which allows multiple transport/network protocols of different types to bind to a single network interface card driver, and also allows a single protocol to bind to multiple network interface card drivers.

Each network adapter typically comprises a software driver 30 that runs on the host CPU, and network adapter hardware 36. Driver 30 and adapter 36 communicate data across a bus accessible by both the CPU and the adapter hardware, such as the PCI local bus shown in FIG. 1. Adapter 36 connects to physical network connection 38 for communication to peer devices.

Figure 3:
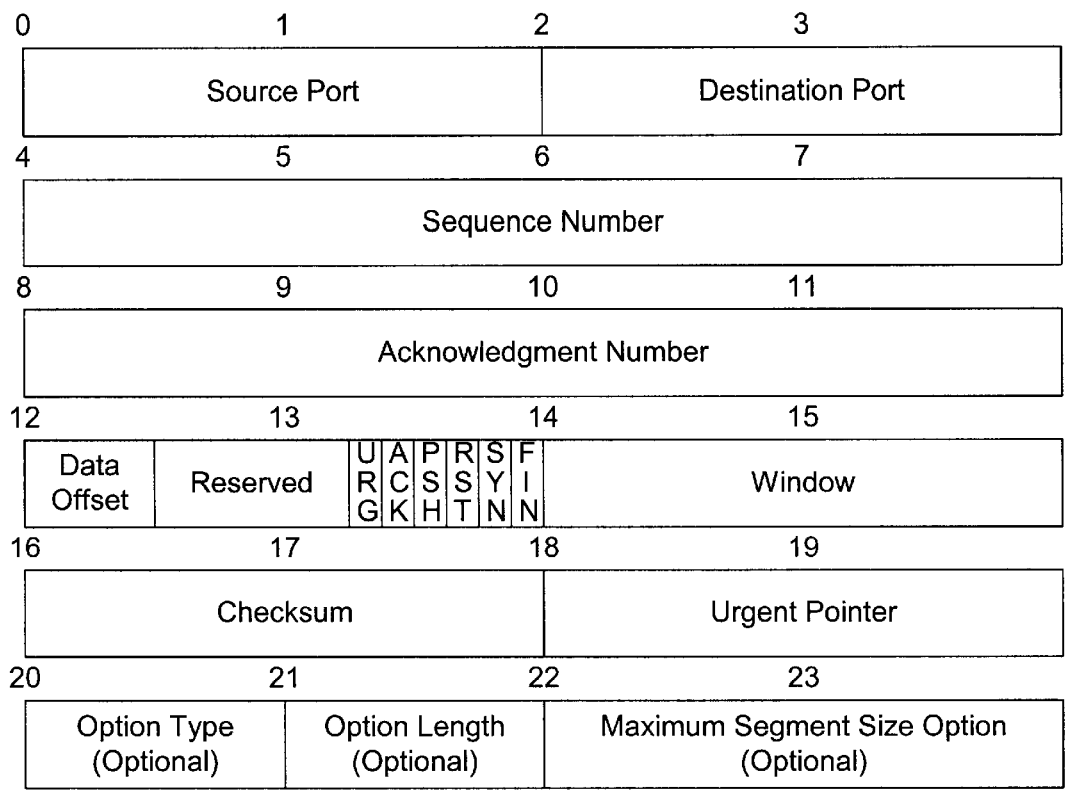
FIG. 3 depicts the TCP header format.

FIG. 3 shows the format of a TCP packet header. The header has a minimum length of 20 octets, which can be extended in four octet increments in order to transmit header options. Several header fields are pertinent to this disclosure. The source port and destination port are part of the information necessary to match the packet with its appropriate connection (the rest of the information is contained in the IP header, not shown). The sequence number is used to count transmitted data octets, and represents (usually) the first data octet contained in the packet. The acknowledgement number is used to indicate successful receipt of data from the TCP peer, and is valid if the ACK bit is set. The acknowledgement number indicates the sequence number of the next data octet that the sender of the ACK expects to receive—this also implicitly acknowledges the successful receipt of data octets for all smaller sequence numbers.

The window field, together with the acknowledgement number, are used to provide flow control for the connection. The window field indicates the number of data octets, beginning with the one in the acknowledgement field, that the sender of the ACK is prepared to receive. This allows the peer, who knows how much data it has transmitted that has not yet been acknowledged, to calculate how much additional data it may send at this time.

The SYN bit is used to synchronize the TCP peers at connection setup. At connection setup, the peers initialize their sequence numbers, receive window sizes, and maximum receive segment size (also called MSS, this is the maximum number of data octets that can be placed in a single packet). The SYN bit assertion is typically accompanied by an option field entry that specifies the MSS.

Figure 4:
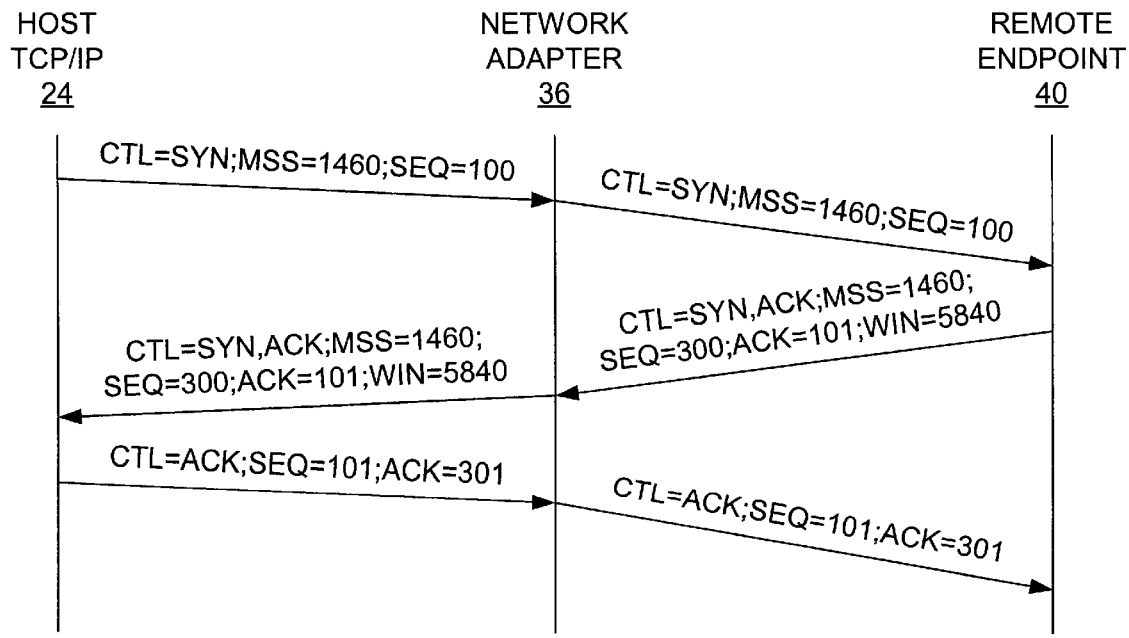
FIG. 4 shows a message sequence for prior art TCP connection setup.

FIG. 4 illustrates, by pertinent header contents, how a typical TCP connection is established. In this figure, CTL indicates which control bits are set in the header; MSS indicates the MSS requested; SEQ indicates sequence number; ACK indicates acknowledgement number, and WIN indicates the window size. Although either endpoint may initiate the connection, in FIG. 3 the host TCP/IP 24 initiates it.

Host TCP/IP 24 constructs a synchronization packet with a header containing the desired destination port and network address for the remote endpoint 40. The SYN bit is set, and MSS is set, e.g., to 1460, the Ethernet maximum for TCP/IP data packets. SEQ can be set to an arbitrary start value when the SYN bit is set, and is set to 100 in this example. Network adapter 36 receives the packet from host TCP/IP 24 and relays the packet to remote endpoint 40.

Remote endpoint 40 passes the synchronization packet to its TCP layer, where the packet is interpreted. Remote endpoint 40 then constructs is own synchronization packet for transmission back to host TCP/IP 24. The return packet also has the SYN bit set, and specifies an MSS of 1460 and an initial window size of 5840 (four times the MSS). An ACK is also generated to tell host TCP/IP 24 that data octet 101 is the next data octet that remote endpoint 40 expects to receive. Finally, the return synchronization packet specifies an initial SEQ number of 300 for its own transmissions.

Network adapter 36 receives remote endpoint 40's synchronization packet and forwards it to host TCP/IP 24. Host TCP/IP 24 interprets the packet and declares the connection established. Host TCP/IP 24 generates an ACK packet back to remote endpoint 40. When remote endpoint 40 receives this packet, it also declares the connection established.

Figure 5:
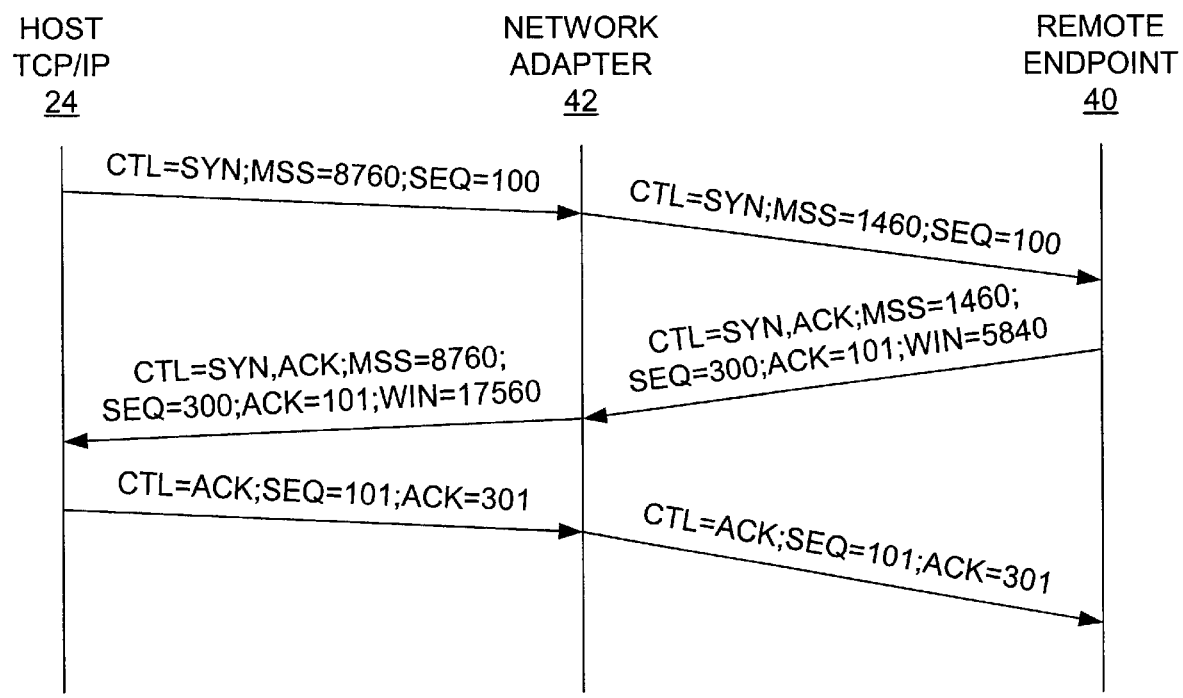
FIG. 5 shows a message sequence for TCP connection setup according to one embodiment of the invention.

FIG. 5 illustrates a synchronization message sequence for one embodiment of the invention. In this embodiment, network adapter 42 has already indicated to its host that it supports an MSS of, e.g., 8760 octets (six times the usable MSS for an Ethernet connection). But network adapter 42's physical network connection only supports an MSS of 1460 octets.

At connection setup, host TCP/IP 24 constructs a synchronization packet that requests an MSS of 8760 octets, consistent with the host's understanding of network adapter 42's capabilities. Network adapter 42 monitors packets as they pass through it, and detects that host TCP/IP 24 has dispatched a synchronization packet with an MSS larger than what the adapter's physical connection supports. Network adapter 42 modifies the packet header by inserting its own MSS of 1460 octets, and notes the connection, the host's requested MSS, and the adapter-submitted MSS in a connection table for later use. The modified synchronization packet, including the substitute MSS, is forwarded to the remote endpoint 40.

Remote endpoint 40 sees the same synchronization packet that is saw in the preceding example, and responds identically to the preceding example. Remote endpoint 40's return synchronization packet is also detected by network adapter 42. The connection attributes contained in the return packet are used by network adapter 42 to retrieve the original and modified MSS values for the connection from the connection table. Using the retrieved values, network adapter 42 modifies the header information in the return synchronization packet by inserting the remote host's original MSS request (8760 octets) in the MSS field of the packet.

Note also that the remote endpoint has indicated a receive window of 5840 octets, which is less than the MSS that host TCP/IP 24 thinks it has negotiated. If the host receives this window size, performance increases with the invention would be limited since the host could only send one packet at a time, the packet less than what it believes the negotiated MSS is. The preferred embodiments thus also emulate a larger receive window (e.g., 17520 octets, twice the host-negotiated MSS) to the host TCP/IP. The actual remote endpoint window value is saved by the network adapter for its own use in following the remote endpoint's window.

When host TCP/IP 24 receives the modified return synchronization packet, it declares the connection established and acknowledges the return synchronization packet. When the remote endpoint receives the acknowledgement, it also declares the connection established. The host then operates under the assumption that the remote endpoint has agreed to an MSS of 8760 octets and has supplied a window size of 17560 octets. The remote endpoint then operates with an agreed MSS of 1460 octets and an advertised receive window of 5840 octets.

Note that if the remote endpoint were to initiate the synchronization sequence, the steps would be similar. Network adapter 42 would supply its maximum emulation MSS to the host initially, and then abide by the host's requested maximum MSS when that was issued. Likewise, in the example above the remote endpoint may supply an MSS lower than 1460, which the network adapter must recognize and abide by in communications with the remote endpoint.

Figure 6:
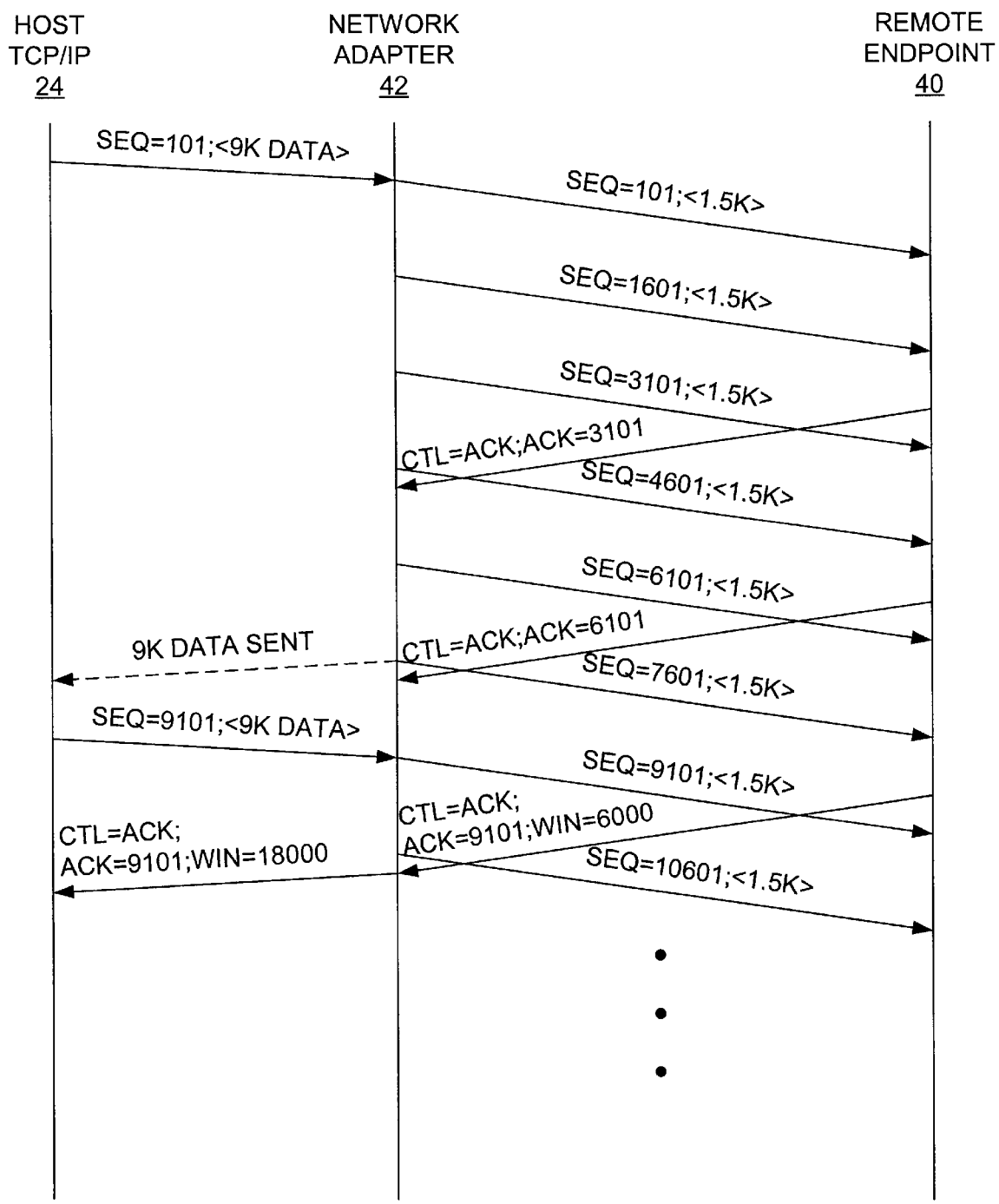
FIG. 6 shows an exemplary data transmission sequence according to an embodiment of the invention.

FIG. 6 illustrates a data transaction for a connection like the one negotiated in FIG. 5. An application has tasked host TCP/IP 24 with transmitting a large data block to remote endpoint 40. For convenience of illustration, the local and remote MSS have been rounded to 9000 and 1500 octets, respectively, and the actual and emulated receive window sizes have been set accordingly to 6000 and 18000 octets.

Host TCP/IP 24 sends a request to transmit a 9000 octet data packet to network adapter 42. Network adapter 42 recognizes that it must segment this packet, and gathers header and data information pertaining to the data packet from memory. Note that the request issued by host TCP/IP 24 preferably indicates the locations in memory for the data and header information, and adapter 42 performs DMA operations (e.g., accesses the PCI local bus as bus master) to main memory to obtain the data independent of the host CPU. The network adapter's tasks include segmenting the data block into six 1500 octet payloads, appending a 20 octet TCP, a 20 octet IP, and a 14 octet Ethernet header to each payload, and computing and inserting sequence number and checksum information into the headers to form packets. Based on remote endpoint 40's 6000 octet receive window, adapter 42 dispatches the first four of these packets (sequence numbers 101, 1601, 3101, and 4601).

After the remote endpoint receives and processes the first two packets (101 and 1601), it returns an ACK 3101 packet. This ACK packet opens the window enough for the network adapter to dispatch the remaining two packets (6101 and 7601) to remote endpoint 40. Around the time that packets 6101 and 7601 are dispatched, network adapter 42 also interrupts host TCP/IP 24 to notify it that its 9K octet packet has been sent. Note that preferably, the ACK 3101 packet is not passed up the stack to host TCP/IP 24, since the ACK of "intermediate" packets that the host did not generate is not helpful to the host, may be confusing to the host, and occupies system resources unnecessarily.

According to what host TCP/IP knows, it has sufficient window size to transmit a second 9K block to remote endpoint 40. It issues a second transmit request, sequence number 9101, to network adapter 42. The network adapter segments this data block as it did the first, although it can only transmit the first two packets (9101 and 10601) immediately based on the current remote window.

The transmission of the first large data block (101) is finally completed when network adapter 42 receives the ACK 9101 packet from remote endpoint 40. The ACK 9101 packet (with a modified receive window size) is passed up the stack to host TCP/IP 24.

Because the host in this example has avoided creating six separate packets and issuing six requests to the network adapter, it has reduced its packet processing overhead substantially. The host also benefits since the network adapter only notifies it once that data has been transmitted and only passes one ACK packet (rather than three or more) for processing.

Figure 7:
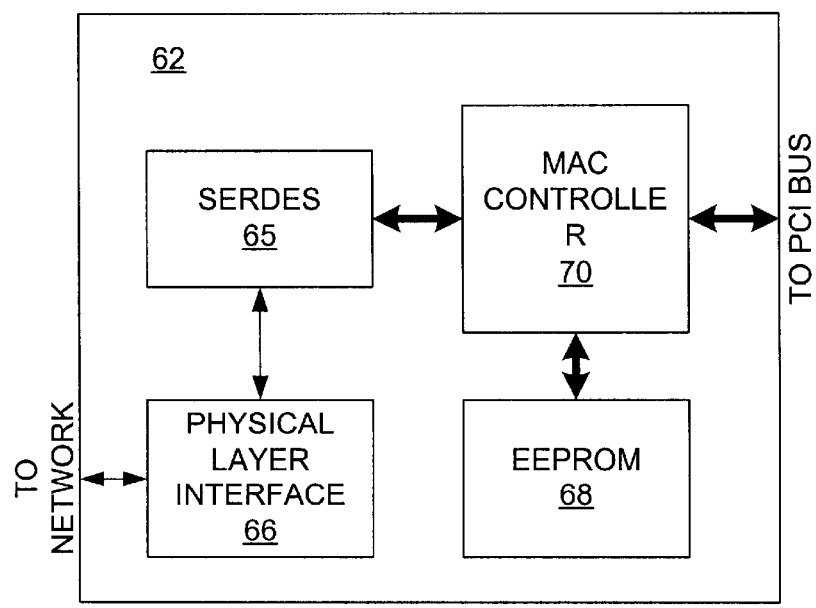
FIG. 7 depicts a network interface card according to an embodiment of the invention.

FIG. 7 shows a block diagram of a NIC 62 according to an embodiment of the invention. Physical layer interface 66 handles network physical signaling tasks, i.e., modulation and demodulation of electrical or optical analog signals representing a digital bit stream. SERDES (Serializer/Deserializer) 65 provides conversion between the serial data format required by physical layer interface 66 and the parallel data format used elsewhere. MAC controller 70, using stored information from EEPROM 68, handles the bulk of the other tasks required of NIC 62.

Figure 8:
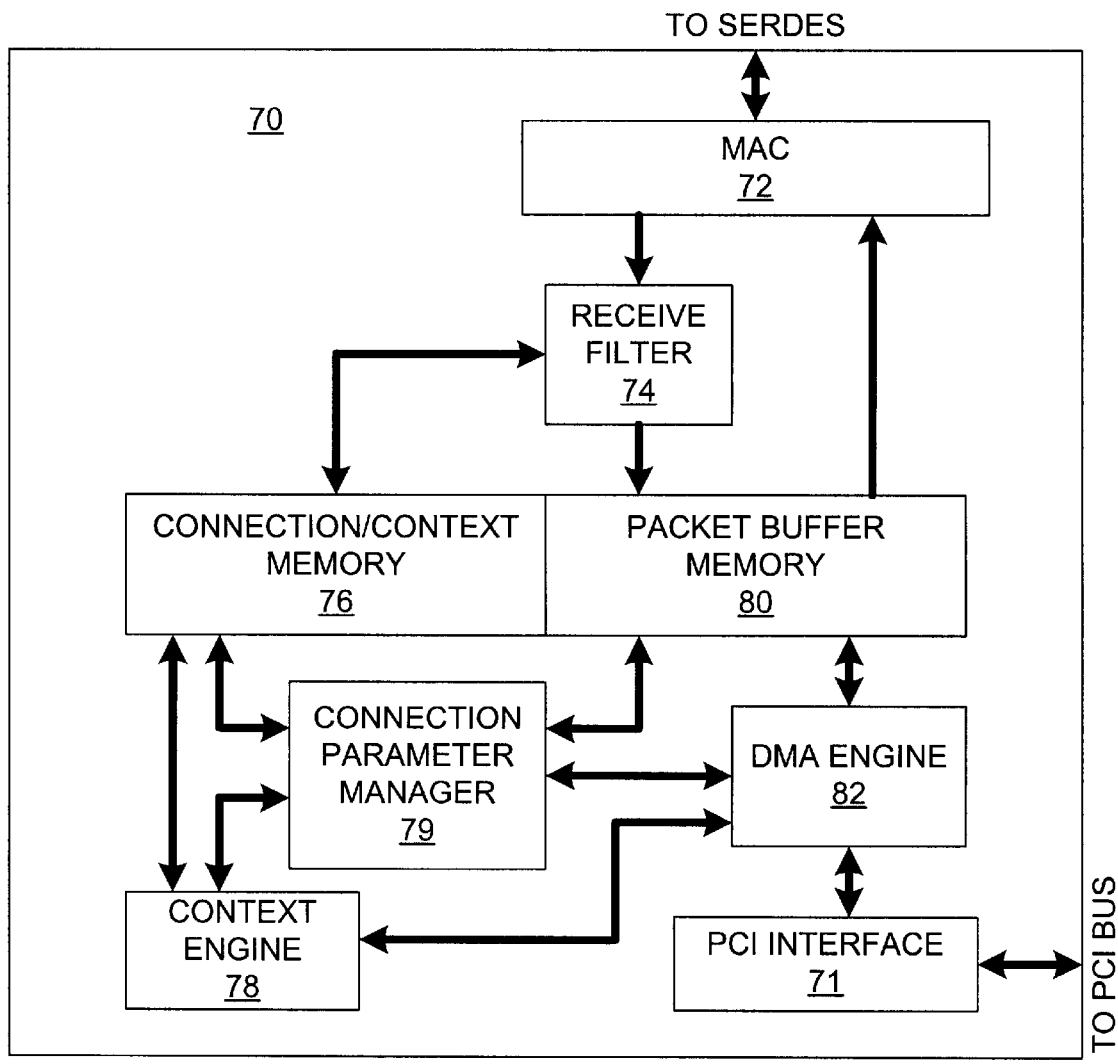
FIG. 8 shows details of the MAC controller for the network interface card of FIG. 7.

Turning now to the detailed configuration of MAC controller 70 shown in FIG. 8, task partitioning within MAC controller 70 will now be described. Within MAC controller 70, MAC 72 contains the logic necessary to implement, e.g., transmit and receive functions for the appropriate link-layer protocol, and to interface with packet buffer memory 80 and receive filter 74. For example, the transmit function can implement a Carrier Sense Multiple Access with Collision Detection (CSMA/CD) protocol using a collision detector and a backoff/retransmit timer. The transmitter and receiver can also implement CRC (Cyclic Redundancy Check) functionality. Such operations are well understood by those skilled in the art, and are preferably minimally impacted by the invention.

Receive filter 74 performs the conventional NIC function of filtering out link layer frames that are not meant for that NIC. But receive filter 74 can also filter out (optionally) received ACK frames that are meant for that NIC, but that will not be passed to the host CPU because they apply to a TCP context that is being handled by NIC 62. Operating in conjunction with connection/context memory 76, receive filter 74 identifies ACK frames that match an open context, and may update that context in connection/context memory 76 using information contained in the ACK frame. Receive filter 74 also decides whether to report such an ACK frame up the stack. Detailed operation of this aspect of receive filter 74 can be found in the description accompanying FIG. 10.

Packet buffer memory 80 resides between MAC 72 and DMA engine 82, and operates as a two-way FIFO (first in first out) for packets passing between them. Receive filter 74 places packets that are to be passed up the stack into packet buffer memory 80. DMA engine 82 takes packets from packet buffer memory 80 in turn and DMAs them to RAM 54 (see FIG. 1) using PCI interface 71. Likewise, for packets to be transmitted, DMA engine 82 DMAs the packet information from RAM 54 using supplied addresses and builds (or places if already built) the packets into packet buffer memory 80. MAC 72 takes these packets from packet buffer memory 80 for transmission in turn.

Figure 9:
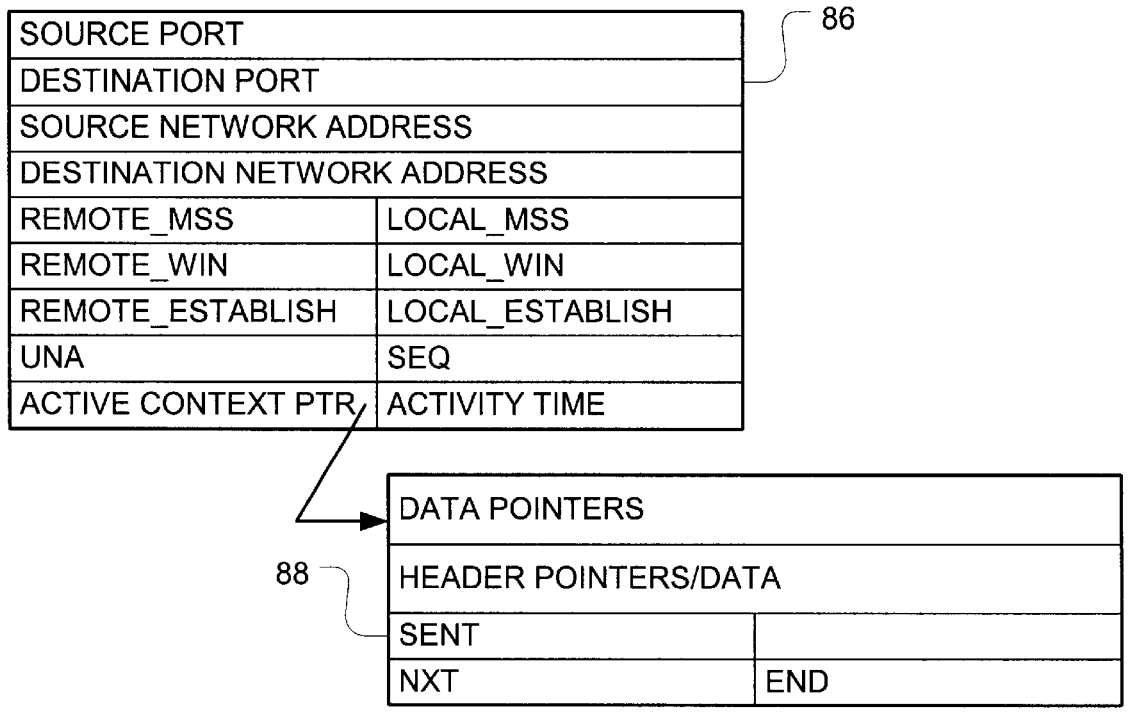
FIG. 9 shows a connection data record structure and a context data record structure.

Connection parameter manager 79 tracks connections that require MSS/window emulation by NIC 70, using connection/context memory 76 to store information pertaining to those connections. For example, FIG. 9 shows one possible structure for a connection record 86 and a context record 88. When a connection is established with a large local MSS, the connection parameter manager creates a connection record 86 in connection memory 76. It maintains values in the connection record that will be needed in the event that it has to segment a large data block. If it later has to segment such a block, it signals context engine 78 to create a context record 88 and link it to the connection record.

Context engine 78 handles segmentation and transmission timing for large data blocks. Context engine 78 signals DMA engine 82 to build packets for a segmented data block at appropriate intervals based on flow control information that is updated in context memory 76 by receive filter 74. Because context engine 78 communicates mainly with DMA engine 82, in a preferred implementation context engine 78 and DMA engine 82 are integrated as a single functional unit.

Connection/context memory 76 is preferably available to receive filter 74, connection parameter manager 79, and context engine 78. Preferably, connection parameter manager 79 creates, updates, and delete connection records 86 from memory 76 as appropriate. Context engine 78 preferably has sole responsibility for opening and closing contexts 88. The context memory can be designed to handle a single connection and a single context. It can also be designed to handle multiple connections/contexts, e.g., by storing each in a separate record.

Various embodiments of the present invention can provide different divisions of labor, for the described emulation tasks, between NIC hardware and NIC driver software. For example, if a large number of concurrent, asymmetric-MSS connections are envisioned, but few concurrent contexts are envisioned, connection parameter manager 79 and connection records 86 can reside respectively in the NIC driver software and host RAM 54 (see FIG. 1), with the driver transferring the appropriate connection record 86 to the hardware as a context is established.

Figure 10:
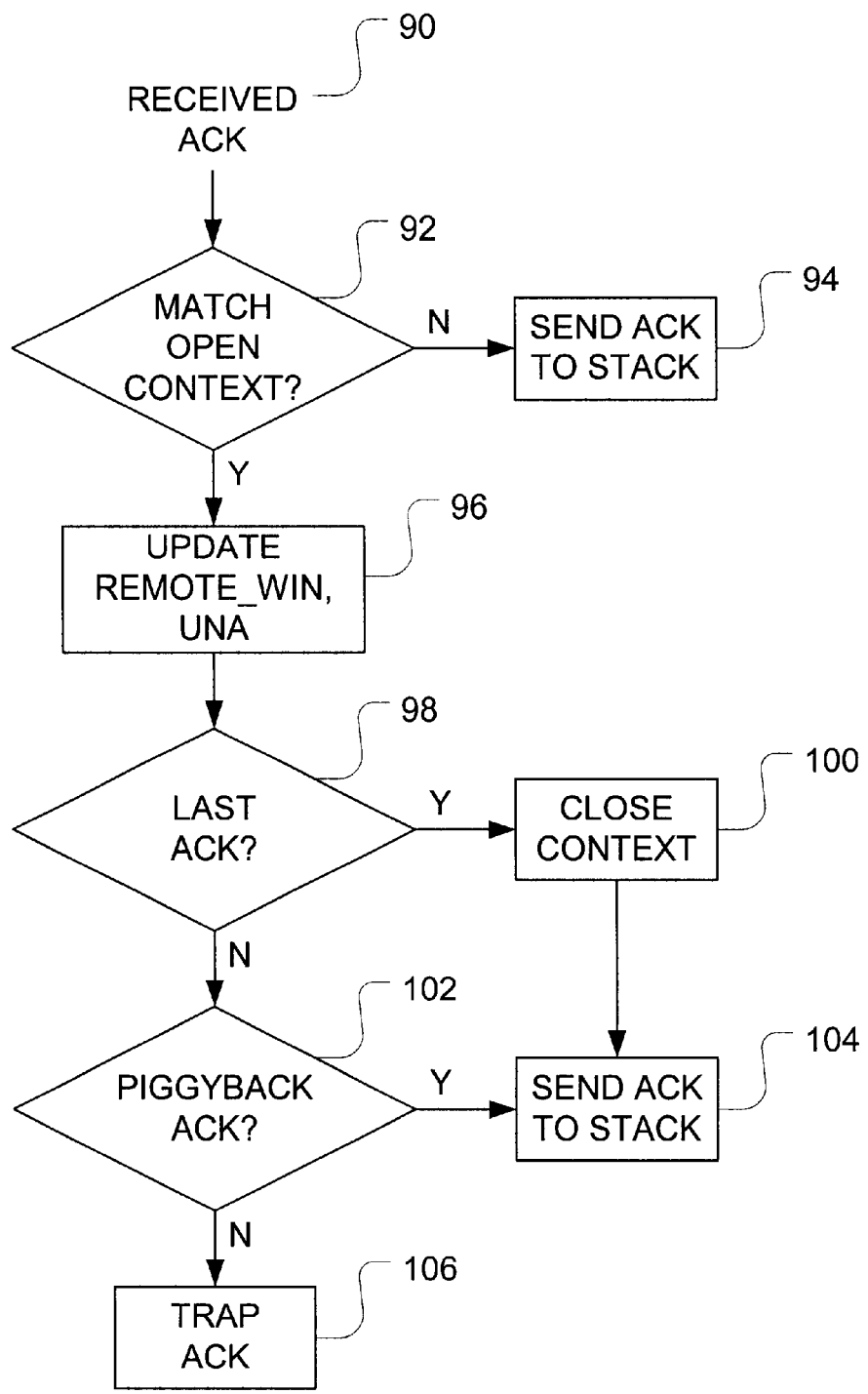
FIG. 10 illustrates a flow diagram for ACK packet filtering according to an embodiment of the invention.
Figure 11:
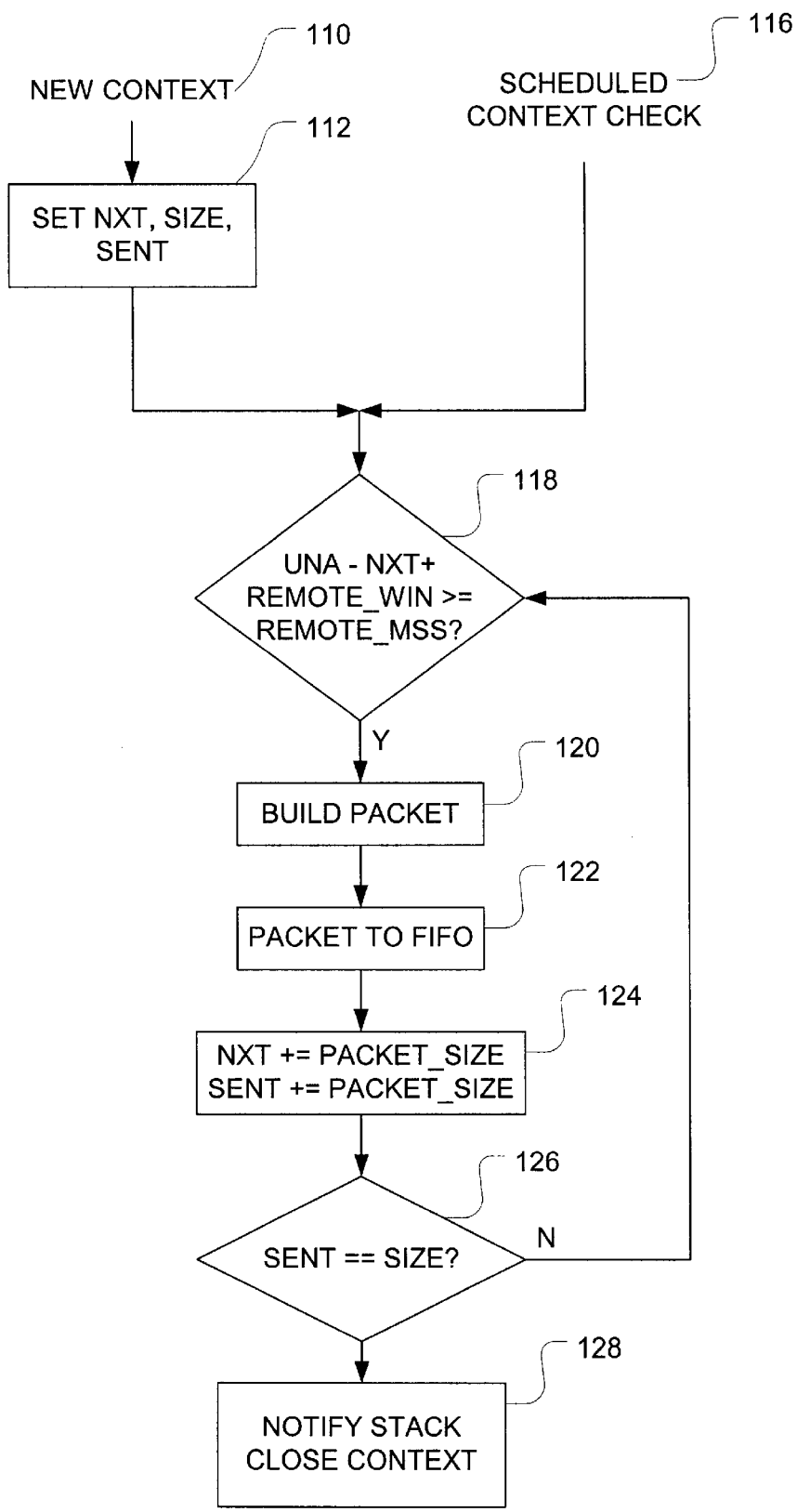
FIG. 11 illustrates a flow diagram for transmit flow control according to an embodiment of the invention.
Figure 12:
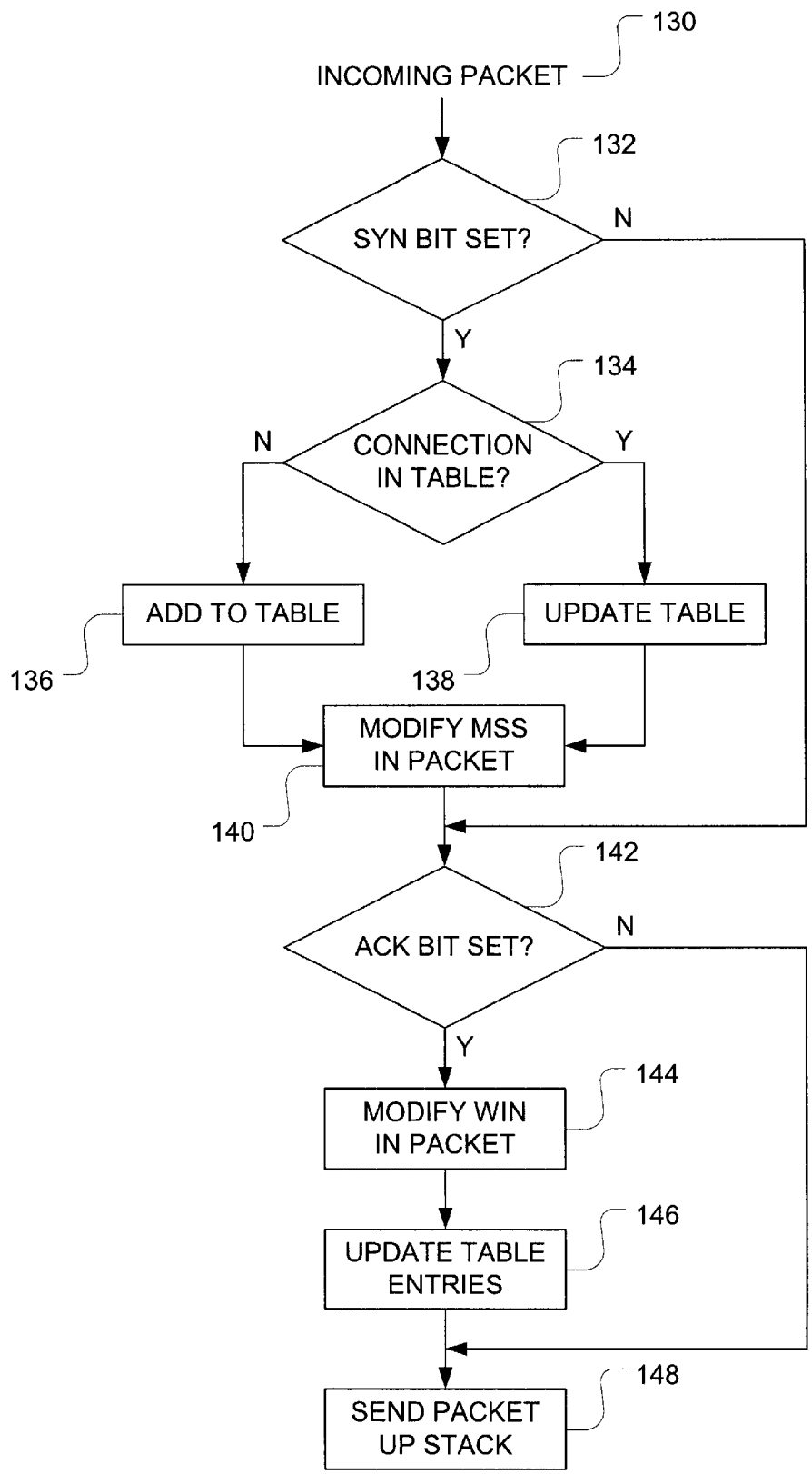
FIGS. 12 and 13 contain, respectively, flow diagrams for incoming and outgoing control packet processing according to an embodiment of the invention.
Figure 13:
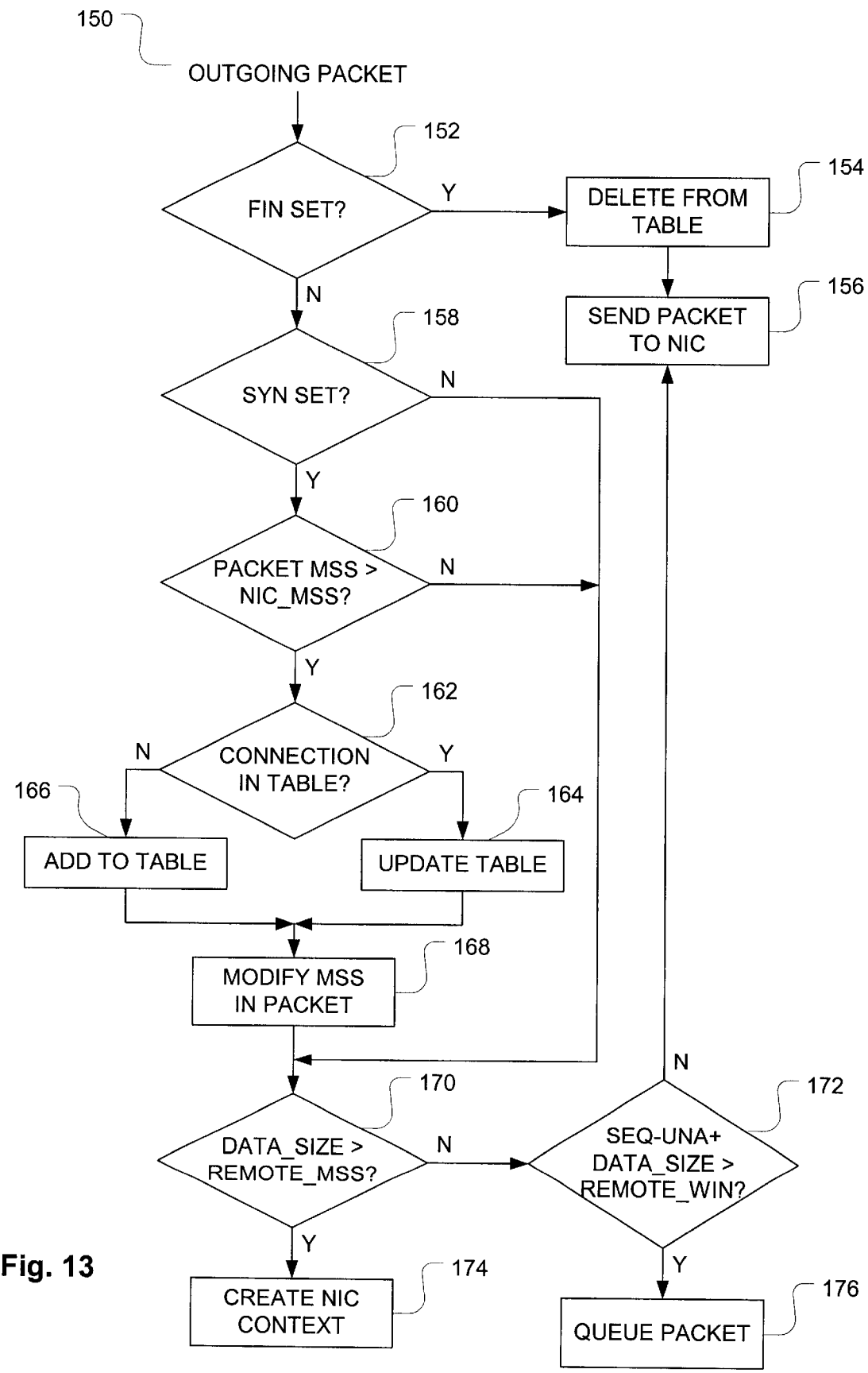
Figure 14:
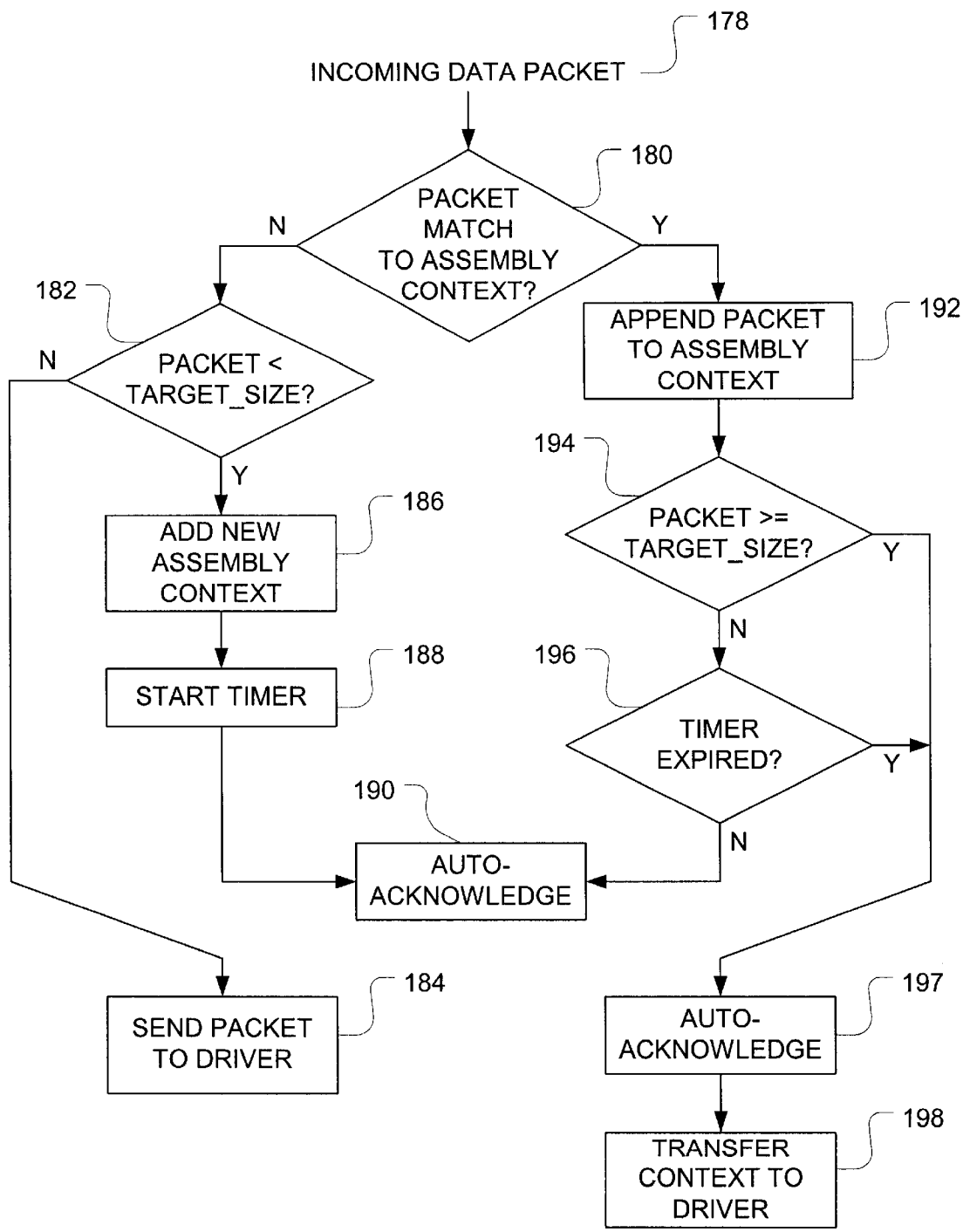
FIG. 14 contains a flow diagram for incoming data packet assembly according to an embodiment of the invention.
Figure 15:
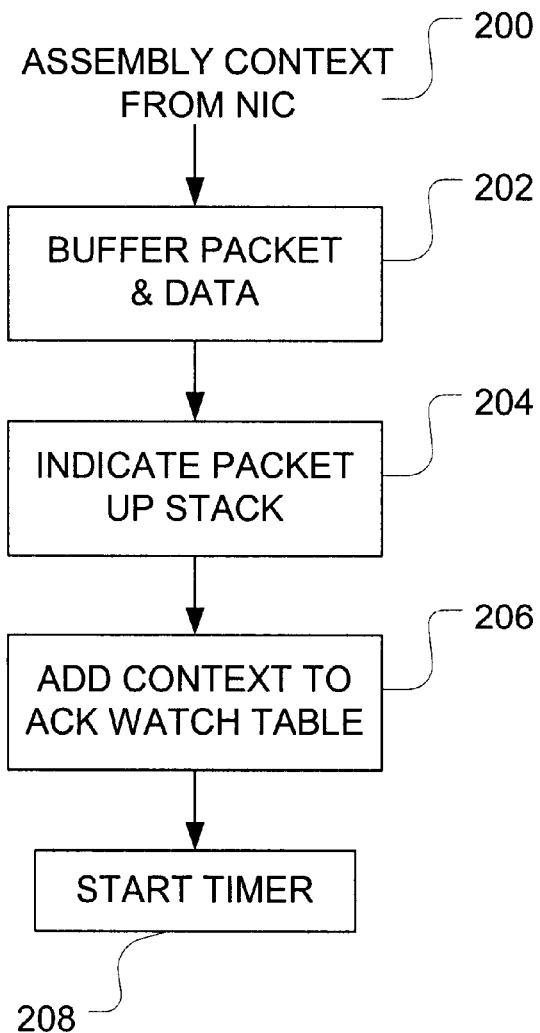
FIGS. 15 and 16 contain flow diagrams for the operation of a packet assembly manager according to an embodiment of the invention.
Figure 16:
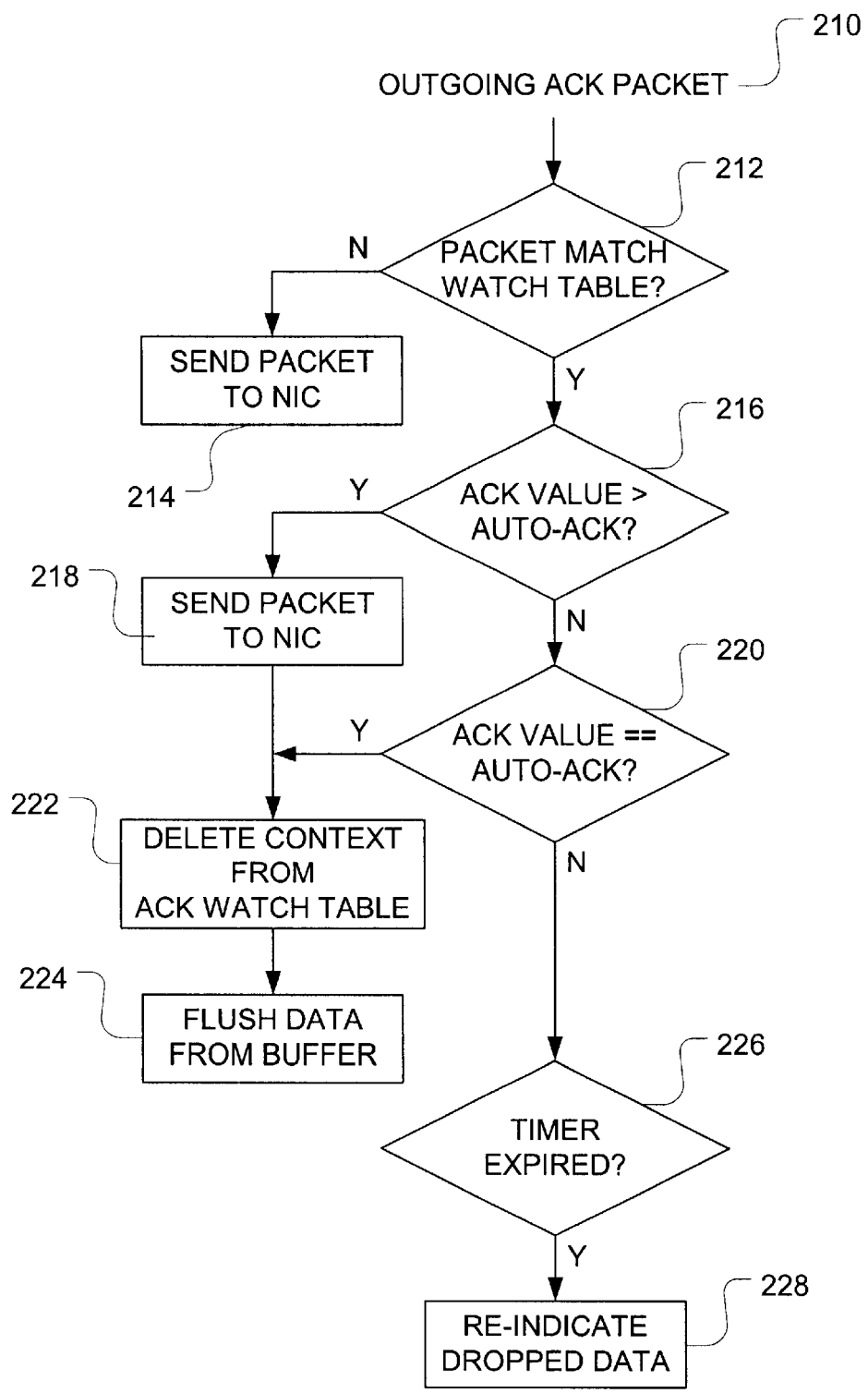

FIGS. 10–16 illustrate in flow control format, for one group of embodiments, several aspects of network adapter operation. FIG. 10 shows, in flow chart form, a process for trapping acknowledgements—one that can be used by receive filter 74. FIG. 11 shows, in flow chart form, a transmit packet flow control process that can be used by context engine 78. FIGS. 12 and 13 show, respectively for incoming and outgoing packets, a connection record maintenance procedure that can be used with connection parameter manager 79. Finally, FIG. 14, 15, and 16 show several aspects of the operation of a network adapter that assembles received packets to create larger packets.

Referring first to FIG. 10, an acknowledgement filtering process is implemented as follows. The network adapter, e.g. connected as in FIG. 1, will receive packets from a variety of remote endpoints, some packets destined for this network adapter and others not. The adapter first filters packets destined for a different Ethernet address. Of the remaining packets, when the network adapter is segmenting a large data packet into smaller transmit data packets for an active connection context, some of the received packets should contain remote endpoint ACKs corresponding to the active connection context. The network adapter must sort the ACKs corresponding to the context from amongst all of its other received traffic. Typically, a first screening step will identify incoming packets having TCP payloads with a valid acknowledgement field. Such a packet will be identified as a "received ACK" and enter the flowchart of FIG. 10 at 90.

For a received ACK, decision block 92 decides whether the ACK matches an active context (before this is done, packet checksums may be verified to ensure that the header data is valid). The number of active connection contexts may be limited to one, in which case the matching operation can, e.g., compare the source and destination ports from the ACK TCP header to those of the context, and compare the source and destination network addresses of the ACK IP header to those of the context. If more than one simultaneous active context is allowed, a wide variety of well-known techniques may be used to efficiently match the ACK TCP and IP headers against a list of active contexts obtained from memory 76. If the ACK does not match any active context, it is queued for forwarding to the host's protocol stack (block 94) by placement in packet buffer memory 80.

When a received ACK matches an open context, the adapter takes several further actions regarding the packet. Receive filter 74 extracts the window and acknowledgement field data from the ACK packet, and uses these at block 96 to update, respectively, the REMOTE_WIN and UNA variables for the connection/context. After context updates are performed, filter 74 determines whether the packet should be sent up the stack. Decision block 98 first determines whether the ACK acknowledges the last data packet of the context. If the acknowledgement indicates receipt of the last data packet, the context is closed (optionally, the actual closing task can be left for context engine 78 to perform) at block 100, and the ACK is sent up the protocol stack to signal successful transmission of the large data packet (block 104).

Another situation that may be addressed is that of the piggyback ACK. A piggyback ACK serves dual purposes—it transmits a data payload, but it also contains an acknowledgement of data received by its sender. In block 102 of FIG. 8, if the ACK packet contains a data payload, the packet is sent up the protocol stack (block 104), even if the ACK contained in that packet pertains only to context packets.

After passing through decision block 102, if the adapter has found no reason to supply the ACK to the host TCP/IP, the ACK is trapped at block 106. A trapped ACK is not sent up the stack, and is preferably simply flushed prior to reaching packet buffer memory 80. The pertinent information from the ACK has already been used at this point to update the context within the adapter.

FIG. 11 illustrates process steps that are preferably performed by context engine 78 during context handling. Two entry points for the process steps are shown: entry point 110 is reached when the connection parameter manager requests a new context task, and entry point 116 is reached according to a context service schedule.

Entry point 110 is reached when a new segmentation/transmission task is requested by the connection parameter manager. The network adapter initializes a new context corresponding to the task at 110 when it receives the task parameters from connection parameter manager 79. At block 112, various calculated variables are then initialized for the context: NXT is set to SEQ (the next transmit sequence number, which should equal SEQ from the host-submitted large MSS packet); SIZE is set to the data size of the large MSS packet; SENT is set to 0.

Entry point 116 will be reached at quasi-scheduled intervals according to a task scheduler in context engine 78. For instance, each time that DMA engine 82 pushes a transmit frame onto packet buffer memory 80, context engine 78 can check a clock reference to see how long it has been since it has checked the status of an open context. If a desired interval has elapsed since the last check, block 118 will be reached. If multiple contexts are open, each can be visited, e.g., in round-robin fashion so that all get served relatively equally. If the DMA engine has no other pending tasks to serve, context engine 78 can loop repeatedly from entry point 116.

Decision block 118 will be reached for a new context and also at semi-regular intervals while the context is active. Block 118 implements flow control via the TCP windowing mechanism. The value UNA+REMOTE_WIN-NXT is calculated for the context. This value represents the portion of the remotely advertised window that is available for new transmission. If this value is greater than or equal to the lesser of one REMOTE_MSS and the amount of context data remaining to be sent, a one-MSS packet (possibly smaller if it is the last packet) is built at block 120. The packet is submitted to packet buffer memory 80 at block 122, and the values for NXT and SENT are both incremented by the size of the TCP payload at block 124. At block 126, the value of SENT is compared to SIZE. If they are equivalent, all data for the context has been transmitted. Note that a block like block 126 may optionally be included above block 118.

FIGS. 12 and 13 illustrate various operations performed by connection parameter manager 79. Generally, the parameter manager is responsible for detecting connection synchronization (SYN) packets, outgoing close connection packets (FIN), and modifying WIN in incoming packets if appropriate. The parameter manager maintains a table of connections that have been established with different local and remote MSS values.

FIG. 12 shows processing for incoming packets (those sent to the host). As an incoming packet is processed by the network adapter, connection parameter manager 79 examines the packet header. Block 132 checks whether the SYN bit is set. If the SYN bit is set, the connection table is searched at block 134 for a connection record corresponding to the packet's connection. If no entry exists, block 136 creates a connection record, saving port and address, setting the REMOTE_MSS to the packet MSS, setting LOCAL_MSS to the MAX_MSS reported to the host, and setting the REMOTE_WIN and LOCAL_WIN values if the packet contains window information. ACTIVITY_TIME is set to the time of packet receipt.

If instead a connection record already exists (because the host initiated connection setup), the record is updated at block 138. If the packet MSS differs from REMOTE_MSS, REMOTE_MSS is set to the packet MSS. Finally, block 140 modifies the packet MSS to conform to LOCAL_MSS.

Block 142 detects incoming packets with their ACK bit set. Those packets that correspond to active connection records are modified at blocks 144 and 146 by saving the header's window field to REMOTE_WIN and inserting LOCAL_WIN into the header's window field. UNA is also updated using the header's acknowledgement number, and REMOTE_ESTABLISH is set if previously unset.

Once an incoming packet is modified, it is sent up the stack at 148, subject to possible context trapping (see FIG. 10).

FIG. 13 shows processing for outgoing packets (those sent by the host). As an outgoing packet is processed by the network adapter, connection parameter manager 79 examines the packet header. Block 152 checks whether the FIN bit is set, indicating that the connection is being closed. When this bit is set, block 154 will delete the connection from the connection table.

Block 158 checks whether the SYN bit is set in the packet. If it is, the packet MSS is compared against the NIC_MSS (the physically-supported MSS, not the emulated one) at block 160. If the packet MSS is larger, block 162 searches the connection table to see if the connection has already been added (an incoming SYN packet may have been received first). If a connection record for the connection does not exist, a connection record is created at block 166. The record stores connection ports and addresses and sets LOCAL_MSS to the MSS requested by the host, and REMOTE_MSS to the NIC_MSS. It also sets the SEQ number indicated by the host and ACTIVITY_TIME, which indicates the last time the connection record was accessed.

If a connection record already exists for the connection, the table may need updating at block 164. LOCAL_MSS may be different than the table value, the SEQ number may need to be set, and LOCAL_ESTABLISH may be set if the host ACKs. Whether a connection record is preexisting or not, if MSS in the packet exceeds the minimum of the NIC MSS and an indicated REMOTE_MSS, the packet MSS is modified.

For all outgoing data packets, the DATA_SIZE of the packet is checked against the REMOTE_MSS for the connection at block 170. If the DATA_SIZE is larger, a NIC context is created at block 174 (see FIG. 11 for details) to handle breaking up the packet into transmittable packets. Otherwise, the packet is sent intact.

One additional issue with sending packets intact is handled by blocks 172 and 176. Because the NIC will generally indicate a larger remote receive window than actually exists at the remote end, the NIC may receive a small packet from the host before the remote endpoint has authorized its transmission. Block 172 checks the remote window, and will queue the packet in a wait queue at block 176 if the remote window is not large enough. This queue can be revisited when further ACKs are received from the remote endpoint.

Most network adapters comprise both a hardware component and a software driver component that runs on the host. Although many of the functions described herein could be implemented in the software driver, those that would increase CPU-adapter communications significantly or require significant extra host processing resources would be less attractive if driver-based. Header manipulation and connection table updates are generally suited for driver implementation, and thus the connection parameter manager preferably resides in the driver. This is particularly advantageous when the NIC emulates a larger-than-actual remote window size, since, if the processor were to load up multiple connection window queues simultaneously, the data can be queued on host memory until the NIC hardware can consume it. A driver implementation also allows the connection table to have a flexible size, and frees the NIC hardware from the responsibility for handling a large table.

With the preceding embodiment, the remote endpoint will send and the adapter will relay data packets of REMOTE_MSS size to the host. For a server that transmits much more data than it receives, this may be acceptable. For a device that receives significant data via the network adapter, it may be advantageous to have the network adapter combine multiple received data packets into a single packet of roughly LOCAL_MSS size before forwarding the packet to the host TCP/IP. FIGS. 14–16 illustrate functional aspects of this embodiment.

FIG. 14 demonstrates packet assembly processing. Incoming data packets 178 have their connection information matched against a list of assembly contexts at block 180, each such context representing an active large packet assembly operation for a given connection. If a data packet does not match, processing is transferred to block 182, where the packet data size is compared against a "target" data size for that connection, TARGET_SIZE. TARGET_SIZE may be related to the LOCAL_MSS for the connection, e.g., half the LOCAL_MSS or LOCAL_MSS–REMOTE_MSS. If the packet is not smaller than the target, it is sent to the driver at block 184. If the packet is smaller than the target, block 186 creates a new assembly context where the packet will be "parked" to see if other packets can be appended to it. Block 188 starts a timer that will be used to ensure that the packet is not parked for too long.

When data packets are received that are matched to active assembly contexts, block 192 appends the data from the packet to the parked data of the matching context. Block 194 then checks whether the aggregate size of the parked data exceeds the TARGET_SIZE, and block 196 checks whether the timer that was set at block 188 has expired. If either of these conditions evaluates true, the context is transferred to the driver at block 198 and the single aggregate parked data packet is sent up the stack.

Blocks 190 and 197 perform an auto-acknowledge function. When packet data is parked, the host TCP/IP cannot generate ACKs because it does not know that data has been received. The remote endpoint most likely expects ACKs for every two data packets it sends. The NIC should meet this expectation when parking. Otherwise, in some cases, the remote endpoint may perform retransmission, because it receives no ACKs as expected. The auto-ack function generates ACK packets for the parked packets, and transmits these ACK packets to the remote endpoint. Preferably, the auto-acknowledge function contains a configurable parameter N, where an ACK packet will be generated every N packets if the timer has not expired.

The auto-ack function contains some risk, since the aggregate packet may be dropped further up the stack even though the NIC has reported that the parked data packets were received successfully. FIGS. 15 and 16 show a driver-implemented function to prevent data loss in such a situation.

When an assembly context packet 200 is received from the NIC, the driver buffers the packet in a watch buffer at 202 before sending the packet up the stack at 204. The assembly context is added to an ACK watch table at block 206, and a timer is started at 208.

Outgoing ACK packets 210 are compared to the ACK watch table at block 212. If they ACK the connection corresponding to a watched packet, blocks 216 and 220 compare the header acknowledgement number to the sequence number that has already been AUTO-ACKed. If the acknowledgement number exceeds the AUTO_ACK number the packet is transmitted. If the two numbers are equivalent, the packet is not sent, but in either case the driver knows it is safe the delete the context from the ACK watch table (block 222) and flush data from the buffer (block 224).

If the data is never ACKed, the timer will eventually expire (block 226). The driver can "re-indicate" the dropped data at block 228 by indicating the packet cached in the ACK watch table up the stack (e.g., repeating FIG. 15).

Various modifications to the above embodiments also fall within the scope of the invention. The described receive filter trapping and context update functions need not be incorporated in a receive filter prior to packet buffer memory. In some embodiments, this functionality can be placed entirely in the DMA engine, with filtering occurring before packets are DMA transferred to main memory. An advantage of this approach is that it loosens the time constraint on the pre-buffer processing, particularly where a large number of simultaneous contexts are being serviced. The disadvantage of this approach is that it adds some delay in when ACKs are processed for a context (although they are still processed much faster than if they were sent up the stack).

The NIC can also be designed to fetch more than one REMOTE_MSS or REMOTE_WIN of data each time it performs a DMA operation from host memory. Data that fits within the current window can be immediately packetized, while the remainder of the data is temporarily stored in a prefetch memory onboard the NIC. The prefetch memory is preferably a different logical memory than the packet buffer memory, although both could share the same physical memory space on the NIC, and could even use defined operators to avoid physical memory movement when packets are "built". The minimum and maximum amounts of data that can be fetched in any DMA operation for a context could, e.g., be controlled by thresholds set by the device driver.

There can be several advantages to basing data fetch operations only loosely on window size. One advantage of fetching more than one window size of data is that fewer (but larger) transactions occur on the PCI bus, thus improving the efficiency of bus utilization—particularly when the window size is relatively small. Conversely, there is also an advantage in initially fetching less than one window size of data when the window is very large. By fetching less data, the packet buffer is less likely to be consumed by a stream of packets that are all part of one context, thus making it possible to achieve some level of "fairness" by increasing the amount of interleaving of packets from multiple contexts.

Where multiple contexts can be open at once, the round-robin approach mentioned above is only one of many possible approaches to scheduling. For instance, contexts could be prioritized such that when the NIC has an open window for multiple contexts, the context with the highest priority would be serviced first. The priority could be assigned by the driver when the context is created (for contexts not assigned a priority or assigned the same priority, round-robin could be used to determine priority between them). Preferably, the NIC hardware supports both the round-robin and at least one priority approach, such that the software driver could configure the device to the desired scheduling approach.

One of ordinary skill in the art will recognize that the concepts taught herein can be tailored to a particular application in many advantageous ways. Some of the network adapter functionality described herein may also be implemented in the software driver section of the adapter, and vice-versa. The concepts taught herein are also applicable to reliable transport mechanisms other than TCP. Such minor modifications are encompassed within the invention, and are intended to fall within the scope of the claims.

What is claimed is:

1. A method for operating a network adapter coupled to a host computer running a transmission control protocol layer, the method comprising:

the network adapter intercepting connection negotiation packets passing between the transmission control protocol layer and a remote endpoint, wherein the connection negotiation packets can contain a maximum segment size field;

the network adapter modifying the maximum segment size field of the intercepted packets as necessary such that the transmission control protocol layer receives an indication that the remote endpoint has accepted a first maximum segment size for the connection and the remote endpoint receives an indication that the host computer has accepted a second, smaller maximum segment size for the connection; and, upon receiving a request from the transmission control protocol layer to transfer an original data packet larger than the second maximum segment size to the remote endpoint over the connection, the network adapter segmenting the original data packet into multiple secondary data packets, each having a data size no greater than the second maximum segment size, and transmitting the multiple secondary data packets to the remote endpoint.

2. The method of claim 1, further comprising:

the network adapter intercepting connection acknowledgment packets sent from the remote endpoint to the transmission control protocol layer and modifying remote endpoint flow control information in the acknowledgment packets to be consistent with a maximum packet size equal to the first maximum segment size; and the network adapter controlling the transmission timing of data packets sent over the connection from the host computer to the remote endpoint based on the original remote endpoint flow control information.

3. The method of claim 2, wherein the remote endpoint flow control information comprises a window size field, and wherein modifying remote endpoint flow control information comprises calculating an emulated window size and substituting the emulated window size for the received window size in the window size field.

4. The method of claim 3, wherein calculating an emulated window size comprises:

calculating the aggregate size of (1) all data packets that have been sent over the connection to the remote endpoint and have not yet been acknowledged, and (2) all data packets that are queued for transmission over the connection; and subtracting this aggregate size from a preset multiple of the first maximum segment size to form the emulated window size.

5. The method of claim 2, further comprising the network adapter trapping an acknowledgement packet sent from the remote endpoint to the transmission control protocol layer when the acknowledgement packet acknowledges receipt of only one or more, but not all of, the multiple secondary data packets.

6. The method of claim 2, further comprising upon receiving a request from the transmission control protocol layer to transfer an original data packet larger than the second maximum segment size to the remote endpoint over the connection, the network adapter fetching, from the host computer, a block of data larger than the second maximum segment size, and storing data from the block of data that cannot be immediately transmitted to the remote endpoint.

7. The method of claim 6, wherein the remote endpoint flow control information comprises a window size field, and wherein the block of data is larger than the window size field.

8. The method of claim 1, further comprising the network adapter keeping a connection table and updating the connection table, when the connection is negotiated, with an entry that identifies the connection and indicates the connection's differing local and remote maximum segment sizes.

9. The method of claim 8, further comprising the network adapter sensing when the transmission control protocol closes the connection and, at that time, deleting the connection table entry for the connection.

10. The method of claim 8, wherein the connection table contains space for multiple entries, the method further comprising the network adapter creating table entries for multiple coincident connections and using the table entries to service their representative connections.

11. The method of claim 10, wherein when multiple coincident connections are being serviced, the method further comprising scheduling packets corresponding to the connections by a method selected from the group of methods consisting of round-robin scheduling, context priority scheduling, and combinations thereof.

12. The method of claim 1, further comprising the network adapter:

receiving first and second data packets, each pertaining to the connection and having a size not greater than the second maximum segment size, from the remote endpoint;

assembling the data from the first and second data packets into a single data packet having a size greater than the second maximum segment size; and passing this single data packet up to the transmission control protocol layer as if it had originated at the remote endpoint.

13. The method of claim 12, further comprising the network adapter receiving additional data packets, pertaining to the connection, and assembling the data from these additional data packets onto the single data packet prior to passing the single data packet up to the transmission control protocol layer.

14. The method of claim 13, further comprising halting the assembling operation and passing the single data packet up to the transmission control protocol layer upon the first to occur of:

a preset time since the arrival of the first data packet elapsing; and the size of the single data packet meeting a pre-configured target size.

15. The method of claim 12, further comprising the network adapter generating an acknowledgement packet that acknowledges the first data packet, and transmitting this acknowledgement packet to the remote endpoint.

16. The method of claim 15, further comprising the network adapter watching for a corresponding host acknowledgement packet from the transmission control protocol layer whenever it has acknowledged a data packet to the remote endpoint, and re-passing the single data packet up to the transmission control protocol layer if the corresponding host acknowledgement packet is not received within a preset time of the first passing of the single data packet up to the transmission control protocol layer.

17. The method of claim 1, further comprising the network adapter indicating to the transport protocol layer at initialization that it supports the first maximum segment size, when at the physical layer it does not in fact support the first maximum segment size.

18. A network adapter comprising:

a network interface;

a packet buffer memory to buffer packets for transmission over the network interface;

a connection parameter manager to negotiate, for a connection, a first maximum segment size with a local host and a second, smaller maximum segment size with a remote endpoint;

a context engine to establish and service a connection context when the local host requests transmission over the connection of an original data packet having a size greater than the remote endpoint's maximum segment size; and a packet engine to segment the original data packet into multiple secondary data packets, each having a size no greater than the remote endpoint's maximum receive segment size, and place these secondary packets into the packet buffer memory.

19. The network adapter of claim 18, wherein the connection parameter manager detects synchronization packets passing between the local host and the remote endpoint, and modifies the maximum segment size field in the synchronization packets as they pass through the adapter.

20. The network adapter of claim 19, wherein the connection parameter manager detects acknowledgement packets passing from the remote endpoint to the local host, and modifies the window size field in the acknowledgement packets as they pass through the adapter.

21. The network adapter of claim 18, wherein the network adapter comprises a hardware component and a host-resident driver component, the connection parameter manager residing in the driver component.

22. The network adapter of claim 18, further comprising a receive filter to associate acknowledgement packets, received via the network interface, with the connection context, wherein the context engine controls when the packet engine queues data packets for transmission in the packet buffer memory, according to flow control information taken from the acknowledgement packets.

23. The network adapter of claim 22, the receive filter comprising an acknowledgement packet trap that prevents selected acknowledgement packets for a context from being relayed from the network adapter to the host.

24. The network adapter of claim 23, further comprising a context memory to store variables pertinent to the context.

25. The network adapter of claim 24, wherein the context memory stores variables pertinent to multiple contexts, and wherein the context engine is capable of handling multiple open contexts.

26. The network adapter of claim 18, further comprising a receive packet assembler to concatenate the data from multiple data packets received from the remote endpoint into a single data packet, larger than the second maximum segment size, prior to relaying the data to the host.

27. An article of manufacture comprising a computer-readable medium containing a driver program for a network adapter, the driver program causing a processor to execute:
   a connection parameter manager to negotiate, for a connection, a first maximum segment size with a local host and a second, smaller maximum segment size with a remote endpoint; and
   a context scheduler to match host-originated data packets to the connection and request a packet segmentation context on the network adapter when a matched data packet is larger than the second maximum segment size.

28. The article of manufacture of claim 27, wherein the connection parameter manager also emulates, to the host, remote window flow control for the connection, and the context scheduler comprises a queue to delay host-originated data packets when required by the actual remote window flow control information received from the remote endpoint.

29. The article of manufacture of claim 27, further comprising a packet assembly manager to accept assembled packets that have been created by the network adapter by concatenating multiple data packets, and buffer the assembled packets until they are acknowledged by the host.

* * * * *